Feb. 3, 1970   L. R. PHILLIPS ET AL   3,492,751
REVERSIBLE DUCK DECOY
Filed July 10, 1968
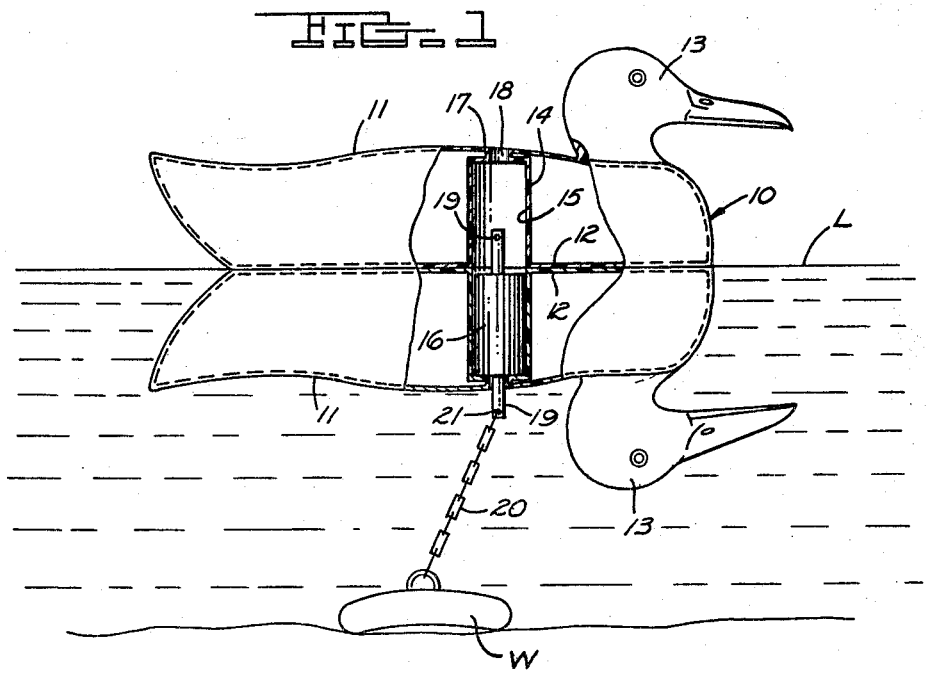
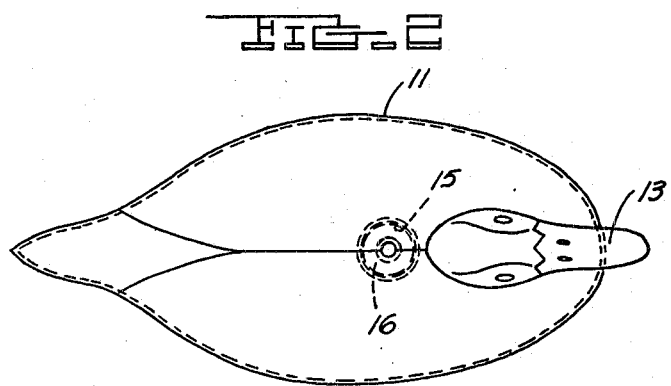
INVENTOR
LARRY RICHARD PHILLIPS
ROBERT McINNIS
BY
Barnes, Kisselle, Raisch & Choate
ATTORNEYS

United States Patent Office 3,492,751
Patented Feb. 3, 1970

3,492,751
REVERSIBLE DUCK DECOY
Larry R. Phillips, 3234 Colorado, Flint, Mich. 48506, and Robert McInnes, 1108 Fairway Drive, Linden, Mich. 48451
Filed July 10, 1968, Ser. No. 743,897
Int. Cl. A01m *31/06*
U.S. Cl. 43—3
16 Claims

ABSTRACT OF THE DISCLOSURE

A duck decoy comprising a body made of two sections. Each section has the configuration of a duck body and the sections are joined together so that the duck bodies are operatively disposed in a manner that when one of the portions is upright, the other is inverted, and that when floated in water, only one of the sections is visible. A shiftable weight is provided to maintain the upright section in upright position.

---

This invention relates to duck decoys and particularly to a reversible duck decoy.

Among the objects of the invention are to provide a reversible duck decoy which includes shiftable weight means for maintaining whichever of the duck portions is upright in an upright position.

In the drawings:

FIG. 1 is a part sectional elevational view of the duck decoy embodying the invention.

FIG. 2 is a plan view of the same.

Referring to FIGS. 1 and 2, the duck decoy 10 embodying the invention comprises two hollow sections 11 which are preferably made of blown plastic material and includes a flat base 12. Each of the sections 11 has a configuration of a duck body including a duck head 13. The sections are adhered together along the walls 12 so that the configuration of each duck body is oppositely disposed.

Each of the sections further includes an integral tubular wall 14 forming a cylindrical opening 15. When the sections 11 are joined together, the tubular walls 14 of the two sections are axially aligned to form a cylindrical opening 15. A shiftable weight 16 is disposed in the cylindrical opening 15 and is operable by gravity to move downwardly and maintain whichever the sections 11 is upright in an upright position.

Each section further includes an integral wall 17 defining an opening 18 of smaller diameter extending to the exterior. The weight 16 includes oppositely disposed projections 19 that extend outwardly through whichever of the openings 18 is in downward position to serve as point of attachment for a weight. As shown, the weight W is connected by a chain 20 to a hole 21 in the end of the projection 19.

The sections 11 are preferably made of plastic material which will float. The size and construction of the sections and the size of the weight 16 are selected such that the duck decoy floats substantially along the area of juncture of the walls 12 so that the waterline L is along the plane of the walls 12.

What is claimed is:

1. In a duck decoy, the combination comprising:
a body of buoyant material,
said body including a first portion having the configuration of a duck body,
and a second portion having the configuration of a duck body joined to the first portion so that the portions are oppositely disposed in a manner that when one of the portions is upright the other is inverted and when floated in water only one of the portions will be visible,
and a shiftable weight on said body operable by gravity to move in a manner to maintain whichever of the portions is upright in an upright position.

2. The combination set forth in claim 1 wherein the specific gravity and construction of the body and the positioning and size of the weight are such that the duck decoy floats substantially along the area of juncture of the two portions.

3. The combination set forth in claim 1 wherein said weight is positioned within said body, each said portion of said body having an opening extending to the exterior such that a part of the weight extends through said opening to serve as an anchor point when that body portion is inverted.

4. The combination set forth in claim 1 wherein said shiftable weight is mounted within said body, said body having guide means therein for guiding the movement of said weight.

5. The combination set forth in claim 4 wherein said guide means comprises a tubular wall extending transversely across said two portions of said body.

6. The combination set forth in claim 5 wherein the two portions of the duck body include openings therein communicating with the opening defined by the tubular wall, said shiftable weight having oppositely disposed portions thereof so that one of said oppositely disposed potrions extends through the adjacent opening when the weight has been shifted in that direction to serve as an anchor point.

7. The combination set forth in claim 1 wherein said two portions of said duck body are made of two similar hollow sections fastened together.

8. The combination set forth in claim 7 wherein each said section has a tubular cylindrical wall therein, said sections when joined having the cylindrical openings thereof aligned to define a guideway for said shiftable weight.

9. The combination set forth in claim 8 wherein said sections are made of plastic material.

10. In a duck decoy, the combination comprising:
a hollow body of buoyant material,
said body including a first hollow section having the configuration of a duck body and a duck head,
and a second hollow section having the configuration of a duck body and a duck head joined to said first section so that the sections are oppositely disposed in a manner that when one of the sections is upright the other is inverted and when floated in water only one of the sections will be visible,
and a shiftable weight on said body operable by gravity to move in a manner to maintain whichever of the portions is upright in an upright position.

11. The combination set forth in claim 10 wherein the specific gravity and construction of the body and the positioning and size of the weight are such that the duck decoy floats substantially along the area of juncture of the two sections.

12. The combination set forth in claim 11 wherein said shiftable weight is mounted within said body, said body having guide means therein for guiding the movement of said weight.

13. The combination set forth in claim 12 wherein said guide means comprises a tubular wall extending transversely across said two sections of said body.

14. The combination set forth in claim 13 wherein the two sections of the duck body include openings therein communicating with the interior of the tubular wall, said shiftable weight having oppositely disposed portions thereof so that one of said oppositely disposed portions extends through the adjacent opening when the weight has been shifted in that direction to serve as an anchor point.

15. The combination set forth in claim 10 wherein each said section has a tubular cylindrical wall therein, said sections when joined having the cylindrical walls thereof aligned to define a guideway for said shiftable weight.

16. The combination set forth in claim 15 wherein said sections are made of plastic material.

References Cited

UNITED STATES PATENTS

| | | | |
|---|---|---|---|
| 796,147 | 8/1905 | Reynolds | 43—3 |
| 1,923,442 | 8/1933 | Kilgore | 43—3 |
| 3,408,763 | 11/1968 | Rudolph | 43—3 |

WARNER H. CAMP, Primary Examiner